United States Patent [19]

Sugisawa

[11] B 3,924,705

[45] Dec. 9, 1975

[54] POWER STEERING MECHANISM

[75] Inventor: Masakazu Sugisawa, Hekinan, Japan

[73] Assignee: Aisin Seiki Kabushiki Kaisha, Kariya, Japan

[22] Filed: Nov. 28, 1972

[21] Appl. No.: 310,149

[44] Published under the Trial Voluntary Protest Program on January 28, 1975 as document no. B 310,149.

[30] Foreign Application Priority Data

Dec. 8, 1971 Japan.............................. 46-099186
Dec. 8, 1971 Japan.............................. 46-099187

[52] U.S. Cl................................ 180/79.2 R; 91/437
[51] Int. Cl.²........................................... B62D 5/10
[58] Field of Search.......... 180/79.2 R; 91/438, 437, 91/436

[56] References Cited
UNITED STATES PATENTS

| 3,365,015 | 1/1968 | Cadiou...................... 180/79.2 R |
| 3,693,747 | 9/1972 | Nishikawa.................. 180/79.2 R |

FOREIGN PATENTS OR APPLICATIONS 1,035,686  7/1966  United Kingdom............ 180/79.2 R Primary Examiner—Kenneth H. Betts
Assistant Examiner—John A. Pekar
Attorney, Agent, or Firm—Pierce, Scheffler & Parker

[57] ABSTRACT

A power steering mechanism for a vehicle comprising a fluid releasing mechanism interposed within a passage means communicating a pair of fluid chambers respectively arranged on opposite sides of a servo piston for controlling the fluid flow between said chambers and ultimately releasing the power steering function according to either or both increase of a vehicle speed and or a rotation angle of a steering wheel.

16 Claims, 6 Drawing Figures

3,924,705

POWER STEERING MECHANISM

BACKGROUND OF THE INVENTION

This invention relates generally to a power steering mechanism for a vehicle, and more particularly to improvements in a fluid releasing mechanism of the power steering for releasing the power steering function according to the increase of a vehicle speed or the increase of the rotation angle of a steering wheel.

There has been no relation in a conventional operation of the power steering mechanism between the rotation angle of a steering wheel and a steering resistance being felt by a driver and, accordingly, there would be danger for the driver to rotate the steering wheel excessively when he would find a obstacle ahead.

Furthermore, it is understood that the steering resistance become gradually decreased in response to the increase of a vehicle speed with the rotating load of a steering wheel being lightened thereby causing the steering of the wheel to become unstable. Accordingly, the power steering mechanism is too much for the vehicle when it is running at a high speed.

SUMMARY OF THE INVENTION

It is, therefore, an object of the present invention to provide an improved power steering mechanism capable of obviating substantially the aforementioned conventional drawbacks by providing a moderate steering resistance against the power steering function depending upon the increase of the vehicle speed and the rotation of the steering wheel.

It is another object of the present invention to provide an improved power steering mechanism of the kind above refered to which is reliable in operation and simple in construction.

BRIEF DESCRIPTION OF THE DRAWINGS

Other objects and attendant advantages of the present invention will become more apparent as the specification is considered in connection with the attached drawings, in which like reference numerals designate like or corresponding parts throughout the several views and wherein.

DETAILED DESCRIPTION OF PREFERRED EMBODIMENTS

Figure 1:
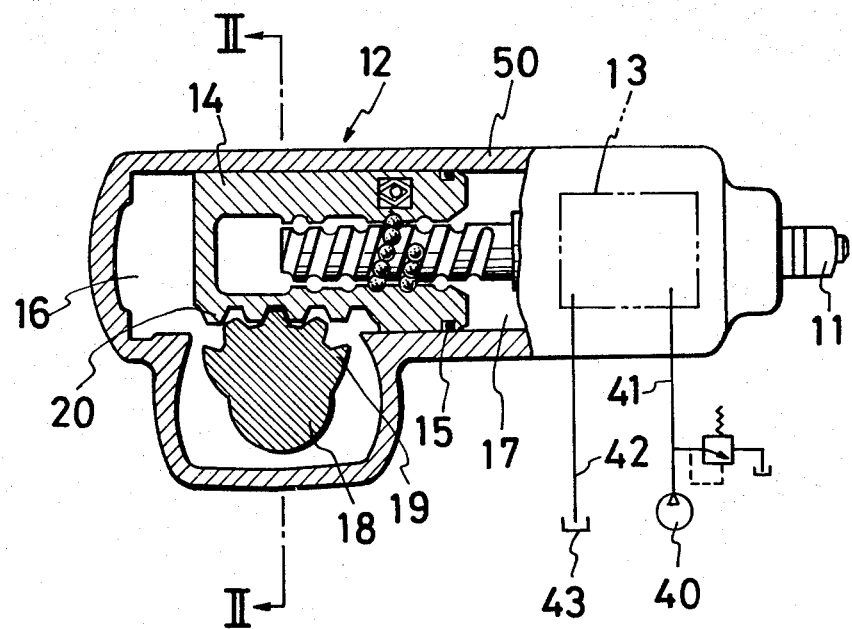
FIG. 1 is a longitudinal sectional view of a first embodiment of a power steering mechanism according to the present invention.

Referring now to the drawings, the numeral 11 is a steering rod operably connected to a steering wheel, not shown, and operatively linked to a changeover control valve 13, roughly shown in FIG. 1, being arranged in a servo motor 12. Within a servo cylinder of said servo motor 12 axially slidably fitted a servo piston 14 sealingly defining two fluid chambers 16 and 17 with a seal member 15. The numeral 50 is a housing of the said servo motor 12. A sector 18 has gears 19 engaging with racks 20 formed on said servo piston 14. The numerals 41 and 42 are passageways fluidly connecting said changeover control valve 13 to a pump 40 and a reservoir 43, respectively.

Figure 4:
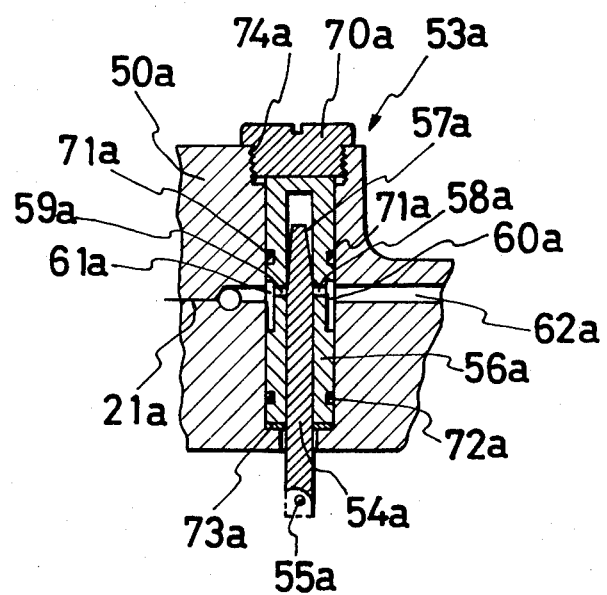
FIG. 4 is a partial view similar to the corresponding part of FIG. 3, illustrating however, a different valve arrangement.

With the conventional construction of power steering mechanism above-described, the present invention further interposes a fluid control valve 53 within a passage means connecting said two chambers 16 and 17. The numeral 56 is a cylinder of said fluid control valve 53 sealably inserted in a bore formed through said housing 50 with seal members 71 and 72. Within said cylinder 56 slidably axially fitted a piston 54 lower end of which is pivotally connected to the upper end of a connecting rod 52 by a pivot pin 55, and the lower end of said connecting rod 52 is pivotally linked to a sector 18 by a pin 51 fixed thereto. The upper end of said piston 54 has reduced annular surface 57 being tapered. As viewed in FIG. 3, at opposite sides of said cylinder 56 provided openings 58 and 59 radially perforated through said cylinder 56 and having, respectively, axially elongated grooves 60 and 61 adjacent thereto at the outer periphery of said cylinder 56. Said opening 58 and said elongated groove 60 are communicated to a passage 22 through a conduit 62, and said opening 59 and the elongated groove 61 are communicated to said passage 21. The numeral 70 is a nut provided with a thread 74 on inner periphery and adapted to be screwed over the upper portion of said cylinder 56 projecting from said bore and having a thread 75 on outer periphery thereof for adjusting the relative position of said cylinder 56 to said piston 54 and said housing 50 by moving said cylinder 56 axially. FIG. 4, in which the corresponding parts are numbered with the corresponding numerals but with letter a, designates another embodiment to achieve such function to adjust the position of said piston. A cylinder 56a is further inserted into a bore of a housing 50a. The numeral 70a is a nut having a thread 74a and screwed into the threaded part of said bore to press said cylinder 56a against the bottom wall of said bore. It is, therefore, possible to adjust the relative position of said cylinder 56a to a piston 54a and said housing 50a by padding a washer 73a of various thickness.

In operation, when the steering wheel, not shown, is rotated to either direction, the changeover control valve 13 is actuated by the rotating movement of said steering wheel transmitted through the steering rod 11 to introduce fluid from the pump 40 into either of said two chambers 16 or 17 through the passageway 41 and either of two passages, not shown, which are extended between said changeover control valve 13 and said two chambers 16 and 17, respectively. Whereupon the fluid is introduced into the chamber 16 at this stage, the chamber 17 becomes fluidly communicated to the reservoir 43 through the another passage and passageway 42 by the said changeover control valve 13 and the fluid under pressure in the chamber 16 supplied from the pump 40 urge the servo piston 14 in addition to a manual force transmitted from said steering wheel through said steering rod 11 to move rightwardly in FIG. 1, thereby the conventional power steering function can be obtained. When said steering wheel being rotated to the reverse direction, the chamber 16 becomes fluidly communicated to the reservoir 43 and the chamber 17 is to the pump 40 by said changeover control valve 13 in the same way, thereby the fluid under pressure in the chamber 17 from said pump 40 push said servo piston 14 to move leftwardly.

The operation of the fluid control valve 53 is, now, explained hereunder. When the steering wheel, not shown, is at a neutral position as viewed in FIG. 3, an extention line through pins 55 and 51 passes a center of the sector 18 and the openings 58 and 59 of the cylinder 56 are closed with the outer surface of the piston 54 as viewed in FIG. 3. When said steering wheel being rotated from the neutral position, said sector 18 is to be rotated according to the conventional operation, that is, by the movement of the servo piston 14 being accompanied by the conventional power steering function explained above, and said piston 54 of said fluid control valve 53 is moved slidably downwardly by means of the connecting rod 52 according to the rotation of said sector 18, thereby the reduced annular surface 57 being tapered of said piston 54 enables said openings 58 and 59 to become gradually opened and, in consequence, the fluid flow between the chambers 16 and 17 is increasingly attained through the passages 21 and 22, a conduit 62, the elongated grooves 60 and 61 and said openings 58 and 59, thereby the power steering function is gradually released and the gradual increase of steering resistance is achieved according to the increase of the rotation angle of the steering wheel.

Figure 2:
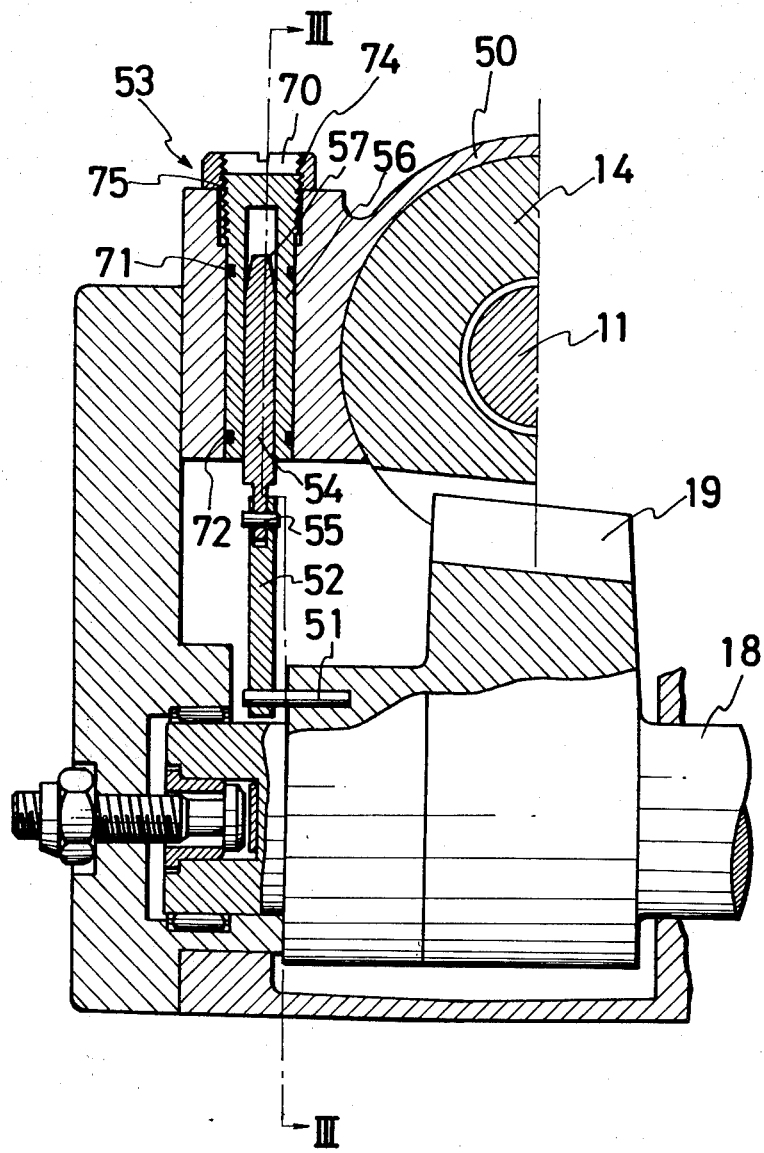
FIG. 2 is a further sectional view of the first embodiment of the present invention, taken along the plane of line II—II in FIG. 1.
Figure 3:
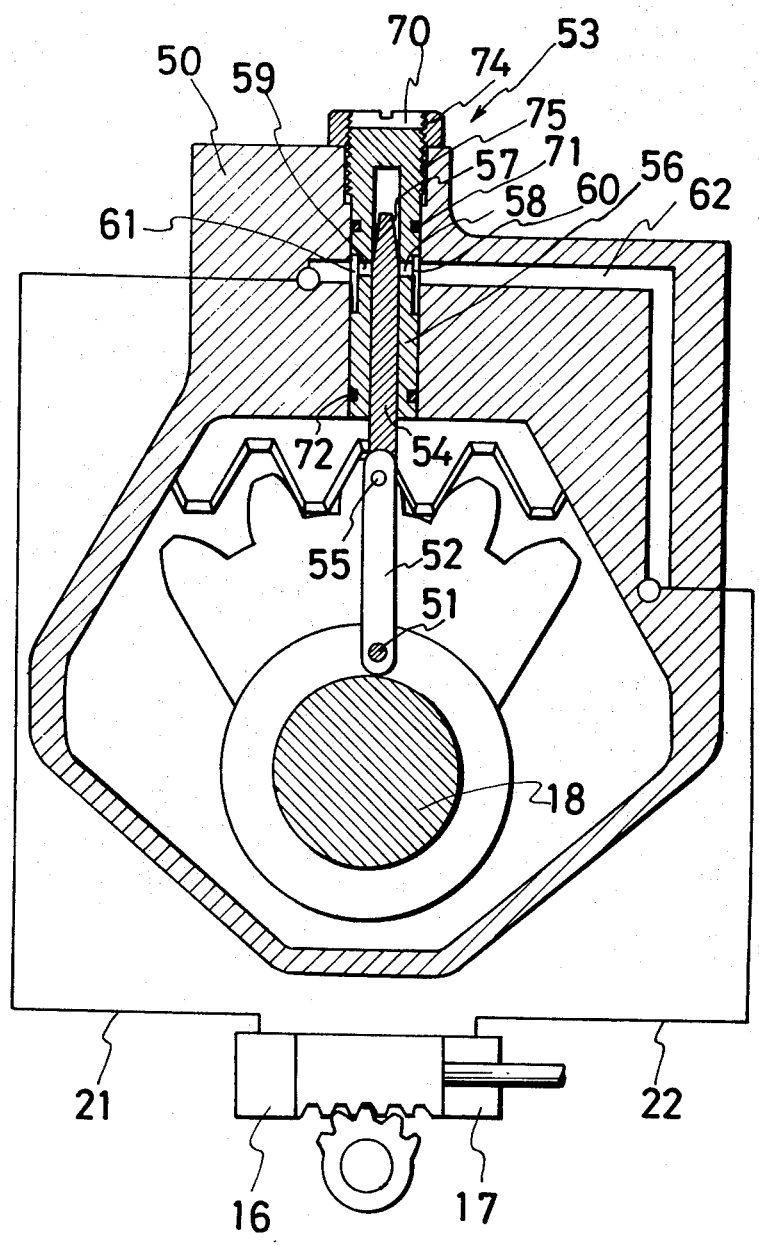
FIG. 3 is a still further sectional view of the first embodiment of the present invention, taken along the plane of line III—III in FIG. 2.
Figure 5:
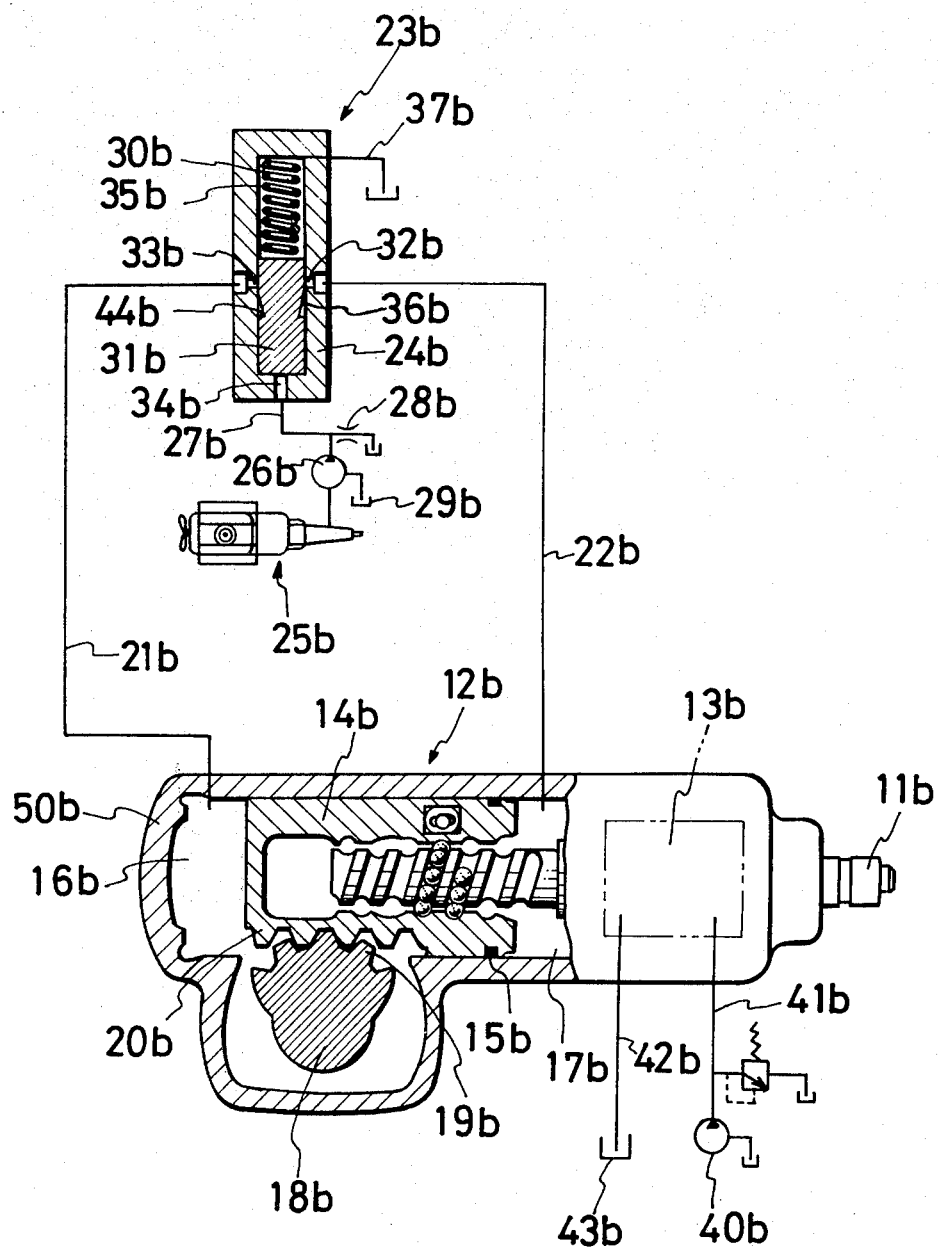
FIG. 5 is a view similar to FIG. 1 and 3, illustrating however, a second embodiment of the present invention.

FIG. 5 designates the second embodiment of a fluid control function of power steering mechanism in which the corresponding parts to those of FIGS. 1–3 have corresponding numerals but with letter $b$. The construction and the operation of the power steering mechanism of this embodiment is the same as the first embodiment explanation of which is, therefore, omitted.

In addition to the conventional power steering mechanism, the present embodiment interposes a fluid control valve 23$b$ between the passages 21$b$ and 22$b$ communicating the two chambers 16$b$ and 17$b$. The said fluid control valve 23$b$ is fixed to a preferred part of the vehicle body. The numeral 24$b$ is a cylinder formed with a bore 30$b$ therewithin and having a piston 31$b$ movable slidably axially within said bore 30$b$. The said cylinder 24$b$ is provided with three openings 32$b$, 33$b$ and 34$b$ which are, respectively, communicating to passages 22$b$, 21$b$ and 27$b$. The numeral 26$b$ is a pump being driven by the revolution of a output shaft of a vehicle engine 25$b$. The numeral 28 is an oriffice for causing the difference of pressure between the fluid in a reservoir 29$b$ and the fluid in the passage 27$b$, thereby liberating the fluid under pressure responsive to the vehicle speed to act on the bottom end of said piston 31$b$ through said passage 27$b$ and said opening 34$b$. Said piston 31$b$ is biased downwardly as viewed in FIG. 5 by a spring 35$b$. The numeral 36$b$ is a annual groove having a tapered surface formed along the outer periphery of said piston 31$b$. A passage 37$b$ is so arranged to drain the fluid leaked from between said piston 31$b$ and said cylinder 24$b$.

In operation, when the vehicle speed is below a predetermined value, the fluid under pressure being supplied by the pump 26$b$ can not activate said piston 31$b$ to move upwardly against the biasing force of said spring 35$b$, thereby said openings 32$b$ and 33$b$ are closed with the outer surface of said piston 31$b$, and no fluid communication between two chambers 16$b$ and 17$b$ is attained. Therefore, a servo motor 12$b$ achieves the conventional power steering mechanism.

When the vehicle speed comes up to the predetermined value, said piston 31$b$ is slidably moved upwardly against the biasing force of said spring 35$b$ by the fluid under pressure supplied by the pump 26$b$ allowing the openings 32$b$ 33$b$ to be gradually opened through the annular groove 36$b$ being tapered. Said annular groove 36$b$ is so arranged that the lower end 44$b$ thereof comes to stay in a line with said openings 32$b$ and 33$b$ when the vehicle is at a maximum speed, thereby the fluid flow between the chambers 16$b$ and 17$b$ is increasingly attained through the passages 21$b$ and 22$b$ openings 32$b$ and 33$b$ in response to the increase of the vehicle speed. The power steering function is, therefore, gradually released according to the increase of the vehicle speed.

Figure 6:
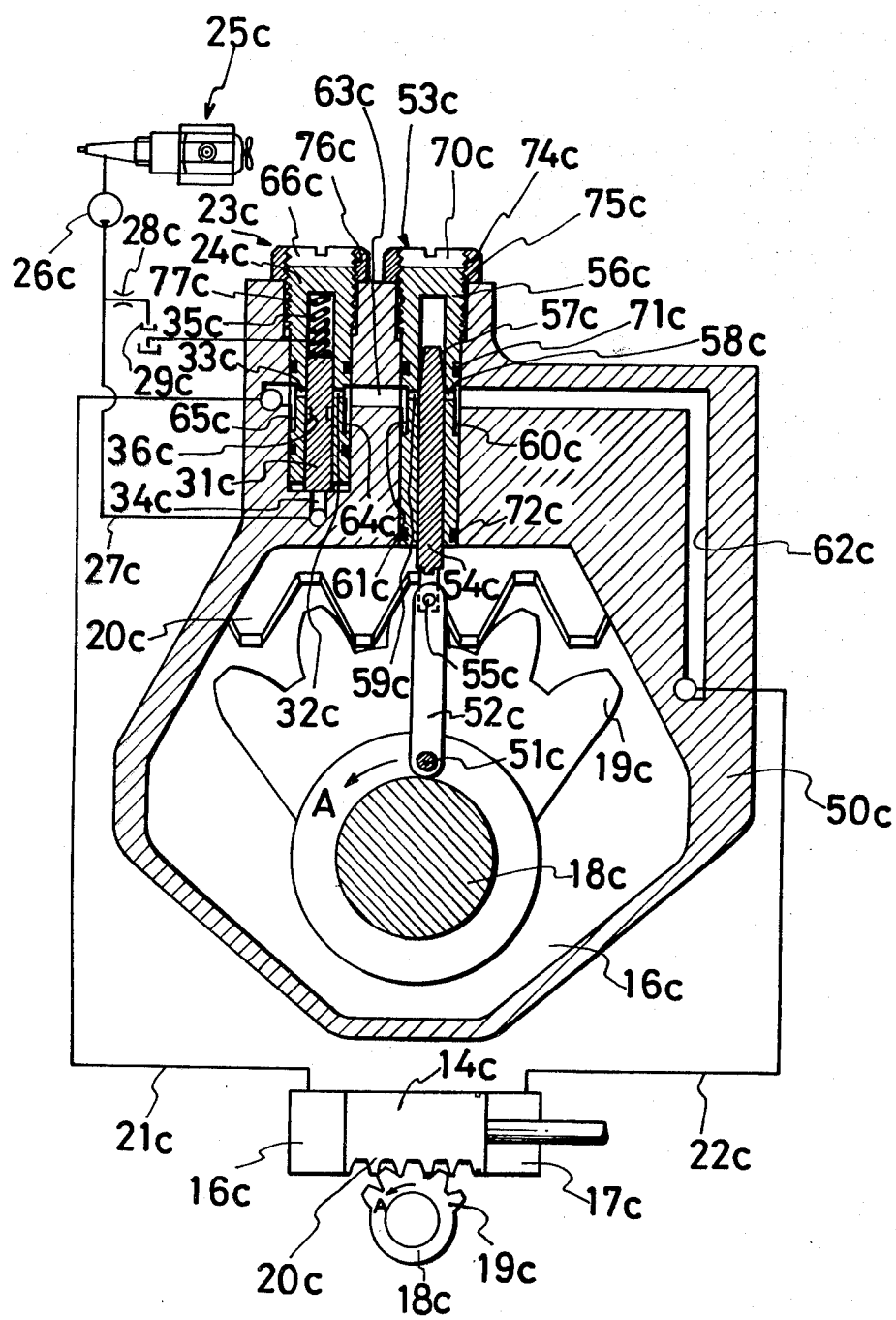
FIG. 6 is a view similar to FIG. 3, illustrating however, a third embodiment of the present invention.

FIG. 6 designates the third embodiment of the fluid control function of power steering mechanism in which the corresponding parts to those of the first and the second embodiments are identified with the corresponding numerals but with letter $c$. In this third embodiment, the first fluid control valve 23$c$ responsive to the vehicle speed being described as 23$b$ in the second embodiment and the second fluid control valve 53$c$ responsive to the rotation angle of the steering wheel been described as 53 in the first embodiment are interposed together in series between the passages 21$c$ and 22$c$ further having a conduit 62$c$ and a passage 63$c$ therebetween which are fluidly communicating two chambers 16$c$ and 17$c$. Said first fluid control valve 23$c$ is preferably inserted sealably into a bore of the housing 50$c$ remaining the top portion thereof having a thread 77$c$ out of said bore over which a nut 66$c$ is screwed for adjusting the relative position of the cylinder 24$c$ to the piston 31$c$ and said housing 50$c$, and the annular groove 36$c$ on said piston 31$c$ has also preferably no tapered surface.

In operation of the present embodiment, when the vehicle speed is below the predetermined value, the openings 32$c$ and 33$c$ of the first fluid control valve 23$c$ are closed with the outer surface of the piston 31$c$ and, therefore, the fluid flow between the passage 21$c$ and the passage 63$c$ is intercepted, thereby normal power steering function can be attained by operating the steering wheel.

When the vehicle speed reaches the predetermined value, said piston 31$c$ is slidably moved upwardly against the biasing force of the spring 35$c$ by the fluid under pressure supplied by the pump 26$c$ allowing said openings 32$c$ and 33$c$ to be gradually opened through the annular groove 36$c$, thereby the fluid communication between said passage 21$c$ and said passage 63$c$ is attained. Whereupon the steering wheel is rotated under this condition, the servo piston 14$c$ operably connected to said steering wheel acts on the sector 18$c$ to rotate, thereby the piston 54$c$ of the second fluid control valve 53$c$ become gradually moved slidably downwardly within the cylinder 56$c$ by means of the connecting rod 52$c$ depending on the increase of the rotation angle of said sector 18$c$, namely, of said steering wheel. Therefore, the reduced annular surface 57$c$ of the piston 54$c$ enables the openings 58$c$ and 59$c$ to be gradually opened, thereby increasingly attain the fluid communication between the chambers 16 and 17 through the passage 21$c$, the opening 33$c$, the annular groove 36$c$, the opening 32$c$, the passage 63$c$ the elongated groove 61$c$, the openings 59$c$ and 58$c$, the elongated groove 60$c$, the conduit 62$c$ and the passage 22$c$ in response to the increase of the rotation angle of the steering wheel. Therefore, the well-known power steering function is gradually released depending on the increase of the rotation angle of the steering wheel and the vehicle speed.

What is claimed is:

1. A power steering mechanism comprising,
a housing provided with a cylinder,
a piston fitted within said cylinder for axial sliding movement therein, operably connected to a steering wheel and defining a pair of opposed fluid chambers within said cylinder,
a sector mounted within said cylinder for operative connection with steering road wheels of a vehicle and operatively connected to said piston,
a reservoir for a fluid,
a pump for the fluid,
a changeover control valve for selectively connecting said reservoir through a first passageway to one of said fluid chambers and said pump through a second passageway to the other of said fluid chambers depending on the direction of turning of the steering wheel to provide an assist for turning said steering road wheels,
a third passage means connecting said two fluid chambers together,
at least one fluid control valve disposed within said third passage means, and
means for opening said at least one fluid control valve in proportional response to increases in at least one operational characteristic of the vehicle while in motion to decrease the assist for turning the steering road wheels.

2. A power steering mechanism as claimed in claim 1 wherein said means for opening said at least one fluid control valve is proportionately responsive to an increase in the rotation angle of the steering wheel.

3. A power steering mechanism as claimed in claim 2 wherein said at least one fluid control valve includes a control cylinder sealably disposed in a bore in said housing and having opposed openings in the wall of said control cylinder opening into said third passage means for communication with said two chambers respectively, and a control piston slidably fitted in said control cylinder to control flow of the fluid between said opposed openings, one end of said control piston projecting from said cylinder, connecting rod means pivotally connected at one end to the projecting end of said control piston and at the other end to said sector, the other end of said control piston having a tapered cross-section, whereby said control piston gradually opens or closes communication between the opposed openings in said control cylinder wall to control flow of fluid through said third passage means proportionately to the rotational movement of said sector.

4. A power steering mechanism as claimed in claim 3 and further comprising means cooperating with the outer end of said control cylinder for adjusting the relative position of the opposed openings in the wall of the control cylinder in said bore with respect to said control piston and said housing.

5. A power steering mechanism as claimed in claim 4 wherein said outer end of said control cylinder extends outwardly from the bore in said housing and wherein said adjusting means comprises a nut member threadedly engaged with the outer end of said control cylinder for adjusting the position of said control cylinder in said bore.

6. A power steering mechanism as claimed in claim 4 and further comprising washer means disposed in the bottom of the bore in said housing for adjusting the position of said control cylinder in said bore and a nut member threadedly engaged with the inner surface of the outer end of said bore for locking said control cylinder in position in said bore.

7. A power steering mechanism as claimed in claim 1 wherein said at least one fluid control valve comprises a first control valve and a second control valve disposed in series in said third passage means, and said means for opening said at least one fluid control valve comprises a first means for opening said first control valve in proportional response to increase in the speed of the vehicle and a second means for opening said second control valve in proportional response to increases in the rotation angle of the steering wheel.

8. A power steering mechanism as claimed in claim 7 wherein said first control valve includes a control cylinder having two opposed openings in the wall thereof opening into said third passage means for communication with said two chambers respectively and a third opening at one end thereof, a control piston slidably mounted within said control cylinder and having a tapered groove along the outer periphery thereof, biasing means disposed between one end of said control piston and the other end of said control cylinder, and a pump actuated by the output of the vehicle engine for supplying pressurized fluid through said third opening to move said control piston against said biasing means, whereby said control piston gradually opens and closes communication between said two opposed openings to control flow of fluid through said third passage means proportionately to the speed of the vehicle.

9. A power steering mechanism as claimed in claim 8 wherein said second control valve includes a control cylinder sealably disposed in a bore in said housing and has opposed openings in the wall of said control cylinder opening into said third passage means for communication with said two chambers respectively, and a control piston slidably fitted in said control cylinder to control flow of the fluid between said opposed openings, one end of said control piston projecting from said cylinder, connecting rod means pivotally connected at one end to the projecting end of said control piston and at the other end to said sector, the other end of said control piston having a tapered cross-section, whereby said control piston gradually opens or closes communication between the opposed openings in said control cylinder wall to control flow of fluid through said third passage means proportionately to the rotational movement of said sector.

10. A power steering mechanism as claimed in claim 7 wherein said second control valve includes a control cylinder sealably disposed in a bore in said housing and having opposed openings in the wall of said control cylinder opening into said third passage means for communication with said two chambers respectively, and a control piston slidably fitted in said control cylinder to control flow of the fluid between said opposed openings, one end of said control piston projecting from said cylinder, connecting rod means pivotally connected at one end to the projecting end of said control piston and at the other end to said sector, the other end of said control piston having a tapered cross-section, whereby said control piston gradually opens or closes communication between the opposed openings in said control cylinder wall to control flow of fluid through said third passage means proportionately to the rotational movement of said sector.

11. A power steering mechanism comprising;
a housing provided with a cylinder,
a piston fitted within said cylinder for axial sliding movement therein, operably connected to a steering wheel and defining a pair of opposed fluid chambers within said cylinder,
a sector mounted within said cylinder for operative connection with steering road wheels of a vehicle and operatively connected to said piston,
a reservoir for a fluid,
a pump for the fluid,
a changeover control valve for selectively connecting said reservoir through a first passageway to one of said fluid chambers and said pump through a second passageway to the other of said fluid chambers depending on the direction of turning of the steering wheel to provide an assist for turning said steering road wheels,
a third passage means connecting said two fluid chambers together,
at least one fluid control valve disposed within said third passage means, and
means for opening said at least one fluid control valve in proportional response to increases in the speed of the vehicle to decrease the assist for turning the steering road wheels.

12. A power steering mechanism as claimed in claim 11 wherein said fluid control valve includes a control cylinder having two opposed openings in the wall thereof opening into said third passage means for communication with said two chambers respectively and a third opening at one end thereof, a control piston slidably mounted within said control cylinder and having a tapered groove along the outer periphery thereof, biasing means disposed between one end of said control piston and the other end of said control cylinder, and a pump actuated by the output of the vehicle engine for supplying pressurized fluid through said third opening to move said control piston against said biasing means, whereby said control piston gradually opens and closes communication between said two opposed openings to control flow of fluid through said third passage means proportionately to the speed of the vehicle.

13. A power steering mechanism as claimed in claim 12, wherein said control cylinder is sealably disposed in a bore in said housing.

14. A power steering mechanism as claimed in claim 13 and further comprising means cooperating with the outer end of said control cylinder for adjusting the relative position of the two opposed openings in the wall of the control cylinder in said bore with respect to said control piston and said housing.

15. A power steering mechanism as claimed in claim 14 wherein the outer end of said control cylinder extends outwardly from the bore in said housing and wherein said adjusting means comprises a nut member threadedly engaged with the outer end of said control cylinder for adjusting the postion of said control cylinder in said bore.

16. A power steering mechanism as claimed in claim 14 and further comprising washer means disposed in the bottom of the bore in said housing for adjusting the position of said control cylinder in said bore and a nut member threadedly engaged with the inner surface of the outer end of the bore for locking said control cylinder in position in said bore.

* * * * *